United States Patent [19]

Neely

[11] 4,199,364
[45] Apr. 22, 1980

[54] GLASS COMPOSITION

[75] Inventor: Homer E. Neely, Tarentum, Pa.

[73] Assignee: PPG Industries, Inc., Pittsburgh, Pa.

[21] Appl. No.: 958,307

[22] Filed: Nov. 6, 1978

[51] Int. Cl.$^2$ .................... C03C 13/00; C03C 3/04
[52] U.S. Cl. ............................... 106/50; 106/52
[58] Field of Search ........................ 106/50, 52

[56] References Cited

U.S. PATENT DOCUMENTS

| | | | |
|---|---|---|---|
| 3,847,627 | 11/1974 | Erickson et al. | 106/50 |
| 3,876,481 | 4/1975 | Erickson et al. | 106/50 |
| 3,892,581 | 7/1975 | Burgman et al. | 106/50 |
| 4,026,715 | 5/1977 | Erickson et al. | 106/50 |

Primary Examiner—O. R. Vertiz
Assistant Examiner—Mark Bell
Attorney, Agent, or Firm—Kenneth J. Stachel

[57] ABSTRACT

Boron-free and fluorine-free glass compositions are provided that have properties of liquidus temperature, softening point and tensile strength similar to those of "E" or "621" glass compositions. These boron-free glass compositions have in percent by weight the following components:

| | |
|---|---|
| $SiO_2$ | 55–61 |
| $Al_2O_3$ | 12–18 |
| MgO | 4–10 |
| CaO | 14–18 |
| $Na_2O$ | 0.1–1.5 |
| $Li_2O$ | 0.1–1.5 |
| BaO | 0.0–1.0 |

The compositions may also have minor amounts of $Fe_2O_3$, $TiO_2$, and $K_2O$. The glass compositions may be only boron-free and may have a minor amount of fluorine.

8 Claims, No Drawings

GLASS COMPOSITION

BACKGROUND OF THE INVENTION

The present invention is related to a boron-free glass composition for producing glass fibers. More particularly, a boron-free and fluorine-free glas composition for producing glass fiber is provided that can be substituted for "E" glass and "621" glass composition used for producing glass fibers.

The conventional glass composition used in producing glass fibers into continuous glass fiber strands are "E" glass and "621" glass. Both of these glasses are calcium-aluminum-borosilicate glasses characterized by a low alkali oxide content usually calculated as sodium oxide ($Na_2O$). "E" glass is generally described and claimed in U.S. Pat. No. 2,334,961. The glass composition of "E" glass is given below in Table 1 with the constituents being in weight percent:

TAble I

| Ingredients | Percent |
| --- | --- |
| $SiO_2$ | 52–56 |
| $Al_2O_3$ | 12–16 |
| CaO | 16–19 |
| MgO | 3–6 |
| $B_2O_3$ | 9–11 |

The "621" glass is a modification of a typical "E" glass formulation as is shown above in Table I and is typically devoid of magnesium oxide (MgO) and has a calcium oxide (CaO) content that is much higher than that usually found in an "E" glass. The "621" glasses are described in more detail in U.S. Pat. No. 2,571,074. The glass composition of the "621" glasses is presented in Table II where the percentages shown are by weight:

TABLE II

| Ingredients | Percent |
| --- | --- |
| $SiO_2$ | 52–56 |
| $Al_2O_3$ | 12–16 |
| CaO | 19–25 |
| $B_2O_3$ | 8–13 |

It is well known in the art that both "E" and "621" glasses contain minor constituents which are typically $F_2$, $Fe_2O_3$, $K_2O$, $Na_2O$, $S_rO$, and MgO, and on occasion BaO. In general the minor constituents are present each in amounts of less than 1 percent by weight in the glass.

The "E" and "621" glass compositions have been so readily accepted in the industry for producing glass fibers, because these compositions can be melted and refined at high rates and relatively low temperatures, have a low alkali content to avoid any hygroscopic problems, and have suitable electrical insulation properties. These glass compositions also have a workable viscosity over a wide range of relatively low temperatures, a low liquidus temperature range, and a low devitrification rate. Generally these glass compositions allow operating temperatures for producing glass fibers around 2,250° F. to 2,500° F. (1232° C. to 1372° C.) where the liquidus temperature is approximately 2,200° F. (1205° C.) or lower. It is advantageous to maintain a fiber forming temperature around 100° F. (55.5° C.) greater than the liquidus temperature in order to avoid devitrification.

In these compositions the silica is the basic glass former and boron oxide, which is also a glass former, is used as a flux. Calcium oxide (CaO), and alumina ($Al_2O_3$) are added to assist in reducing any hygroscopic problems. Generally the boron or any fluorine containing compounds are present in the composition to reduce the viscosity of melt. The $B_2O_3$ and $F_2$ are volatile constituents of both glass compositions. The actual amount of the volatile constituents lost during the melting depends on several factors such as melting temperature, the rate of melting and water content of the melt. The component fluorine is provided by compounds such as fluorspar. The losses of fluorine occuring during glass melting will be of the order of one-half the fluorine added. The fluorine is lost by evolution of fluorine-containing compounds like $SiF_4$.

The amount of fluorine-containing compound that is added contributes significantly to the corrosion of furnace refractories. In addition, the evolved fluorine-containing compounds pose a pollution problem to the environment surrounding the source of the evolved fluorine. For these reasons fluorine-free "E" glass compositions have been developed. An example of such a composition is given by K. L. Lowenstein, in "The Manufacturing Technology of Continuous Glass Fibers," Elsevir Scientific Publishing Company, New York, 1973 at page 30. The composition is given in Table III below in weight percents.

TABLE III

| Ingredient | Percent |
| --- | --- |
| $SiO_2$ | 52.0 |
| $Al_2O_3$ | 14.6 |
| $B_2O_3$ | 8.8 |
| MgO | 2.0 |
| CaO | 21.5 |
| BaO | 0.6 |
| $Na_2O$ | 0.1 |
| $K_2O$ | 0.2 |
| $Fe_2O_3$ | 0.3 |

Mr. Lowenstein notes that the problems of not extending the melting and homogenization rates of glass and not raising the liquidus temperature above 1140° C. must be resolved before a fluorine-free glass composition becomes standard. The component $B_2O_3$ can be provided by Colemanite, boric acid or boric oxide. The losses of $B_2O_3$ occurring during glass melting are likely to be considerable and can range from 15 to 25 percent of the $B_2O_3$ in the melt. Also in recent years the cost of the sources of $B_2O_3$ has risen steadily, causing overall costs in the manufacture of glass fibers to increase substantially. While all costs have in general increased, the boric acid constituent has had a particularly significant effect on the increased cost of glasses for the manufacture of continuous glass fibers. In addition, it has been recently appreciated that since large quantities of $B_2O_3$ are volatilized in the melting process much of the $B_2O_3$ finds its way to the off gas stack and escapes into the environment.

The amount of $F_2$ and $B_2O_3$ escaping into the environment can be reduced by the use of cold top electric melt furnaces rather than furnaces heated by natural gas or by the installation of off gas stack cleaning apparatus. Both of these alternative approaches for reducing the amount of $F_2$ and $B_2O_3$ escaping into the environment are costly. Therefore, in order to reduce the cost of producing glass fibers and to reduce environmental pollution during the production of glass fibers without increasing the cost of production, a glass composition is needed that does not contain $F_2$ and $B_2O_3$ but still retains the favorable properties of "E" glass such as softening point, liquidus temperature, and tensile strength.

One approach for removing boron and fluorine from glass compositions used in producing glass fibers but still retaining the favorable properties of "E" glass for the production of glass fibers has been to substitute titanium dioxide ($TiO_2$) and lithium oxide ($Li_2O$) for boron and fluorine as the fluxing agents in fiberizable glass compositions. Such an approach is described in the following U.S. Pat. Nos. 3,847,627; 3,847,626; 3,876,481 and 4,026,715. In this approach the glass fiber produced from the composition containing titanium dioxide has an unacceptable color. To overcome this handicap additional additives have been included in the glass composition. These additives include zinc oxide (ZnO), strontium oxide (SrO), and barium oxide (BaO). Also in some cases the amount of alkali oxide, (sodium oxide, potassium oxide, and lithium oxide) has been increased in amounts up to 3 percent by weight sodium oxide and potassium oxide, calculated as sodium oxide in equivalent molecular weight percent and up to 2 percent by weight of lithium oxide.

It is an object of the present invention to provide a glass composition free of boron with the addition of few if any additional constitutents to the glass composition but still retaining the favorable fiberizing properties of "E" or "621" glass compositions.

It is a further object of the present invention to provide a glass composition free of boron and fluorine but with similar and acceptable "E" or "621" glass composition properties of softening point, liquidus temperature, and tensile strength.

It is an additional object of the present invention to provide a glass composition free of boron and fluorine similar to "E" and "621" glass compositions in properties and components without the addition of a number of additional components to the composition and while retaining a low alkali content.

SUMMARY OF THE INVENTION

The foregoing objects are achieved by a glass composition having critical amounts of silica ($SiO_2$), alumina ($Al_2O_3$), magnesia (MgO), lime (CaO), a low amount of alkali, and a small amount of barium oxide (BaO) plus a minor amount of foreign materials such as ferrous oxide ($Fe_2O_3$), and titania ($TiO_2$) and the like. The glass composition of the present invention is free of boron and fluorine, thereby being a glass composition that when melted does not release boron or fluorine to the environment.

In general the glass compositions of the instant invention are shown in Table IV wherein the percent is percent by weight:

TABLE IV

| Ingredients | Percent |
|---|---|
| $SiO_2$ | 55–61 |
| $Al_2O_3$ | 12–18 |
| MgO | 4–10 |
| CaO | 14–18 |
| $Na_2O$ | 0.1–1.5 |
| $Li_2O$ | 0.1–1.5 |
| BaO | 0.0–1.0 |

Glass compositions of the type described in Table IV are low alkali, boron-free, and fluorine-free compositions with properties of liquidus temperature, softening point and tensile strength similar to those for "E" glass or "621" glass compositions, thereby permitting the forming of glass fibers without releasing the volatile components boron or fluorine.

The meaning of the phrase "similar properties" refers to glass properties that are not more than about a 5 percent variation from those glass properties for "E" and/or "621" glass compositions.

In the glass composition of Table IV other substituents may also be present in small amounts typically below 1 percent each. In general $Fe_2O_3$ is present in quantities of 0.1 to 0.5 percent, $TiO_2$ between 0.2 to 0.8 percent, $K_2O$ between 0.1 and 0.5 percent and also if the glass composition desired is only a boron-free composition, than a small amount of fluorine up to 1 weight percent can be used in the composition. These minor substituents of typical "E" glasses are referenced in "The Manufacturing Technology of Continuous Glass Fibers," at pages 29–30. As is seen on Table IV above, amounts of $Na_2O$ and $Li_2O$ are always present in the glass composition of the instant invention.

DETAILED DESCRIPTION OF INVENTION

The compositions of a typical "E" glass and "621" glass are shown in Table V below.

TABLE V

| Constituent | "E" | "621" |
|---|---|---|
| $SiO_2$ | 52–56 | 52–56 |
| $Al_2O_3$ | 12–16 | 12–16 |
| CaO | 16–19 | 19–25 |
| MgO | 3–6 | — |
| $B_2O_3$ | 9–11 | 8–13 |

As will be readily understood by one skilled in the art, minor constituents are present in both "E" and "621" glasses. These constituents are typically $F_2$, $Fe_2O_3$, $K_2O$, $Na_2O$, SrO, and MgO and on occasion BaO. In general these minor constituents are present each in amounts of less than 1 percent by weight in the glass. As will readily be appreciated from an analysis of the above formulations the elimination of magnesium oxide in the "621" glass permitted the use of other quantities of $B_2O_3$ in an "E" glass and permitted the addition of substantially more calcium oxide.

A typical "E" glass formulation containing $SiO_2$ (55.2 weight percent); $Al_2O_3$ (14.8 weight percent); $B_2O_3$ (7.3 weight percent); MgO (3.3 weight percent); CaO (18.7 weight percent); $Na_2O$ (0.3 weight percent); $K_2O$ (0.2 weight percent); $Fe_2O_3$ (0.3 weight percent); $F_2$ (0.3 weight percent) gave a liquidus temperature of 1140° C. and tensile strength of single fiber at 25° C. of 370 kg/mm$^2$ and tensile strength of strand, of 175–275 kg/mm$^2$. This was reported in *The Manufacturing Technology of Continuous Glass Fibers*, at page 29.

In accordance with the present invention it has been discovered surprisingly that the $B_2O_3$ and $F_2$ content of a glass used in the manufacture of continuous glass fibers can be eliminated without the addition of substantial quantities of additives like titania ($TiO_2$) or zinc oxide (ZnO) or strontium oxide (SrO) and still achieve similar properties of liquidus temperature, softening point, and tensile strength as achieved for "E" and "621" glasses. It is believed, but the present invention is not limited by such belief, that the elimination of $B_2O_3$ and $F_2$ while still achieving similar glass properties as those of "E" and/or "621" glasses is accomplished by maintaining critical proportions of constituents usually used in "E" and/or "621" glass compositions. There is a low alkali content but sodium oxide and lithium oxide are always present. Also the amount of magnesium oxide is usually equal to or greater than the upper end of the range i.e. 4 to 6 weight percent of MgO used in "E" glass compositions. The amount of sodium oxide as Na$_2$O is always present in an amount in the range of 0.1 to 1.5 weight percent of the composition and an amount of lithium oxide (Li$_2$O) is always present in the amount of 0.1 to 1.5 weight percent, therefore allowing a concentration of alkali of up to around 3 weight percent. The amount of magnesium oxide (MgO) is in the range of about 4 to 10 weight percent of the composition, which is equal to or more than the usual amount of magnesium oxide present in "E" glass composition i.e. 3–6 weight percent, and an amount of MgO, in "621" glass composition of O to allow the use of lower quantities of B$_2$O$_3$. In addition small amounts of barium oxide can be used. The amounts of sodium, lithium, and barium oxide can be used singly or in combination to give a total amount of these components of less than 5 weight percent. Also an amount of potassium oxide (K$_2$O) may be substituted for a small amount of sodium oxide. The amount of K$_2$O is 0.1 to 0.5 weight percent of the composition. Also minor amounts of the typical impurities for a "E" glass composition may be present such as: Fe$_2$O$_3$ in quantities of 0.1 to 0.5 percent, preferably 0.3 and TiO$_2$ between 0.2 to 0.8, preferably 0.6.

The magnesium oxide (MgO) may be added to the glass composition by the raw materials, i.e. as the tramp material in the limestone used to supply calcium oxide (CaO) and if additional magnesium oxide is needed, it can be added dolomite. In addition other sources of magnesium oxide such as magnesium silicates like olivine, or magnesite (magnesium carbonate) can be used. The source of lithium can be lithium carbonate or spodumene or other lithium-containing compounds that will not add high levels of impurities to the glass composition. In general any raw material source known to those skilled in the art for use in "E" and/or "621" glass compositions can be used. Examples of raw material sources for glass compositions are given in the aforereferenced text by K. L. Lowenstein on pages 31–36.

In the preferred embodiment of the present invention the glass composition comprises

TABLE VI

| Constituent | Amounts in Weight Percent |
|---|---|
| SiO$_2$ | 55.9–60.5 |
| Al$_2$O$_3$ | 12.8–17.1 |
| MgO | 5.3–9.4 |
| CaO | 14.9–17.7 |
| Na$_2$O | 0.4–1.1 |
| Li$_2$O | 0.6–1.0 |
| BaO | 0.0–0.9 | and minor amounts of constituents such as Fe$_2$O$_3$ preferably with 0.3 weight percent; TiO$_2$ preferably 0.6; K$_2$O in amounts of 0.1 to 0.5 typically 0.2 weight percent.

In an alternative embodiment the glass composition may be boron-free and may contain small quantities of F$_2$ up to 1 weight percent and preferably around 0.1 to 0.7 weight percent.

The physical properties of the glass composition of Table VI are similar to those of "E" and/or "621" glass compositions, i.e. within not greater than 5 percent variation from the properties of these known glass compositions and are as follows:

TABLE VII

| Softening Point | 800–885° C. | 1475–1625° F. |
|---|---|---|
| Liquidus Temperature | 1116–1232° C. | 2040–2250° F. |
| Tensile Strength | at least 3275 MPa | at least 475/KPSI. | where MPa is megapascals and KPSI is 1000 pounds per square inch.

In preparing glasses in accordance with the instant invention the following Tables VIII and IX are illustrative of suitable batch compositions and glass compositions for producing continuous glass fibers that are boron-free and preferably fluorine-free at an economical cost. Also presented are compositions and test results for a typical "621" glass composition and a "621" glass composition wherein the boron content has been eliminated but the amounts of the other constituents have not been placed in the critical proportions of the instant invention. Also presented in Sample 7 is a composition that falls outside the critical proportion of the composition of the present invention.

TABLE VIII

| Batch | Batch Materials (in grams) | | | | | | | | |
|---|---|---|---|---|---|---|---|---|---|
| | Typical "621" | "621" No Boron | 1 | 2 | 3 | 4 | 5 | 6 | 7 |
| Silica | — | 202.7 | 208.4 | 175.0 | 190.4 | 167.1 | 201.6 | 170.2 | 83.9 |
| Clay | — | 184.0 | 155.7 | 208.8 | 164.1 | 200.6 | 189.2 | 206.1 | 382.0 |
| Dolomite | — | — | 191.8 | 113.7 | 202.0 | 180.9 | 152.7 | 156.4 | 67.9 |
| Limestone | — | 189.8 | 20.1 | 88.3 | 21.0 | 28.8 | 44.5 | 45.1 | 49.8 |
| Periclase | — | — | — | — | — | — | — | — | 16.4 |
| Lithium Carbonate | — | — | 10.5 | 11.8 | 11.5 | 11.6 | 7.1 | 10.5 | — |
| Barium Carbonate | — | — | 5.4 | — | 3.0 | 3.0 | — | 3.6 | — |
| Soda Ash | — | 5.5(sodium sulfate) 1.5(NH$_4$SO$_4$) | 8.1 | 2.4 | 8.0 | 8.0 | 4.9 | 8.1 | — |
| Fluorspar | — | 15.9 | — | — | — | — | — | — | — |
| Coal | — | .6 | — | — | — | — | — | — | — |

TABLE IX

Seven glass compositions were prepared by mixing the batch ingredients listed in Table VIII in the amounts shown to give the amounts of the constituents shown below.

| Constituents (Wt. %) | "621" | "621" (No Boron) | 1 | 2 | 3 | 4 | 5 | 6 | 7 |
|---|---|---|---|---|---|---|---|---|---|
| SiO$_2$ | 53.67 | 58.61 | 59.58 | 57.43 | 57.50 | 55.83 | 60.48 | 56.53 | 53.27 |
| Al$_2$O$_3$ | 13.39 | 14.45 | 12.80 | 17.06 | 13.71 | 16.67 | 15.29 | 16.96 | 30.37 |
| Fe$_2$O$_3$ | .19 | .32 | .48 | .32 | .30 | .31 | .31 | .31 | .37 |
| MgO | .35 | .26 | 8.84 | 5.34 | 9.43 | 8.47 | 6.99 | 7.29 | 3.12 |
| CaO | 21.06 | 23.62 | 14.89 | 17.73 | 15.93 | 15.41 | 15.00 | 15.58 | 10.03 |

TABLE IX-continued

Seven glass compositions were prepared by mixing the batch ingredients listed in Table VIII in the amounts shown to give the amounts of the constituents shown below.

| Constituents (Wt. %) | "621" | "621" (No Boron) | 1 | 2 | 3 | 4 | 5 | 6 | 7 |
|---|---|---|---|---|---|---|---|---|---|
| $TiO_2$ | .55 | .60 | .53 | .71 | .57 | .70 | .64 | .71 | 1.28 |
| $Na_2O$ | .62 | .56 | 1.08 | .40 | 1.05 | 1.09 | .69 | 1.11 | .18 |
| $Li_2O$ | — | — | .90 | 1.01 | 1.00 | 1.01 | .60 | .91 | 1.38 |
| BaO | — | — | .90 | — | .51 | .51 | — | .60 | — |
| ZnO | — | — | — | — | — | — | — | — | — |
| $B_2O_3$ | 8.76 | — | — | — | — | — | — | — | — |
| $F_2$ | 1.41 | 1.56 | — | — | — | — | — | — | — |
| Total | 100.00 | 99.98 | 100.00 | 100.00 | 100.00 | 100.00 | 100.00 | 100.00 | 100.00 |
| Properties | | | | | | | | | |
| Liquidus °C. | 1174 | 1138 | 1220 | 1221 | 1234 | 1206 | 1205 | 1208 | <1232 |
| °F. | 2145 | 2080 | 2228 | 2229 | 2254 | 2203 | 2201 | 2207 | <2250 |
| Softening Pt. °C. | 843 | 901 | 848 | 861 | 844 | 843 | 879 | 865 | 923 |
| °F. | 1550 | 1653 | 1558 | 1582 | 1551 | 1550 | 1614 | 1589 | 1693 |
| Tensile Strength | | | | | | | | | |
| MPa | 3448 | — | 3793 | 3883 | 3772 | 3841 | 3324 | 3807 | Poor |
| KPSI | 500 | — | 550 | 563 | 457 | 557 | 482 | 552 | |
| Melt | | | | | | | | | |

The batch ingredients listed above and the amounts listed were mixed and then melted at temperatures between 2600° F. and 2700° F. (1425° C. and 1480° C.). All melts were made in high silica (Lavasil, 99.9% plus $SiO_2$) crucibles for 5 hours in a Globar furnace. Following pouring to form a slab and annealing, these samples were broken into cullet for determination of 24 hour liquidus temperature, softening point according to the ASTM method, and tensile strength. The measurements of softening point, liquidus temperature, and tensile strength are also presented in Table IX.

The results of Table IX show that the modified "E" glass composition of the present invention free of boron and fluorine gives similar and acceptable glass properties of liquidus temperature, softening point and tensile strength as compared to the "621" composition. The "621" glass minus the boron content not having the critical range of components gave an acceptable liquidus temperature, but an unacceptable softening point. This "621" minus boron glass composition, when melted in 5 hours at 2700° F. (1482° C.) had some unmelted batch present in the glass. This would not be seen with "621" glass with normal boron oxide content. Also Sample 7 shows completely unacceptable liquidus, softening point and a poor melt when the amounts of components similar to those used in the composition of the present invention fall outside the critical ranges.

As can be readily appreciated from the results shown in Table IX, the applicant's composition produced glasses of acceptable properties in terms of liquidus temperature, softening point, and tensile strength with a boron-free, fluorine-free glass composition without the addition of more than minor or trace quantities of such constituents as titanium dioxide ($TiO_2$), strontium oxide (SrO), zinc oxide (ZnO) and potassium oxide ($K_2O$).

While the invention has been described with reference to certain specific embodiments, it is not intended that it be limited thereby except insofar as appears in the accompanying claims.

I claim:

1. A boron-free glass fiber consisting essentially of 55-61 percent $SiO_2$, 12 to 18 percent $Al_2O_3$, 4 to 10 percent MgO, 14 to 18 percent CaO, 0.1 to 1.5 percent $Na_2O$, 0.1 to 1.5 percent $Li_2O$, all percents being by weight of the composition.

2. A glass fiber consisting essentially of the following composition by weight:

| | |
|---|---|
| $SiO_2$ | 55-61 |
| $Al_2O_3$ | 12-18 |
| MgO | 4-10 |
| CaO | 14-18 |
| $Na_2O$ | 0.1-1.5 |
| $Li_2O$ | 0.1-1.5 |
| BaO | 0.1-1.0 |

3. A boron-free glass fiber of claim 2 containing $F_2$ in an amount of up to 1 percent by weight of the composition.

4. A boron-free and fluorine-free glass fiber having the following composition by weight:

| | |
|---|---|
| $SiO_2$ | 55-61 |
| $Al_2O_3$ | 12-18 |
| MgO | 4-10 |
| CaO | 14-18 |
| $Na_2O$ | 0.1-1.5 |
| $Li_2O$ | 0.1-1.5 |
| BaO | 0.0-1.0 |
| $Fe_2O_3$ | 0.1-0.5 |
| $TiO_2$ | 0.2-0.8 |
| $K_2O$ | 0.1-0.5 |

5. A boron-free, fluorine-free glass fiber consisting essentially of the following composition by weight:

| | |
|---|---|
| $SiO_2$ | 55.9-60.5 |
| $Al_2O_3$ | 12.8-17.1 |
| MgO | 5.3-9.4 |
| CaO | 14.9-17.7 |
| $Na_2O$ | 0.4-1.1 |
| $Li_2O$ | 0.6-1.0 |
| BaO | 0.0-0.9 |

6. A boron-free, fluorine-free glass fiber having the following composition by weight:

| | |
|---|---|
| $SiO_2$ | 55.9-60.5 |
| $Al_2O_3$ | 12.8-17.1 |
| MgO | 5.3-9.4 |
| CaO | 14.9-17.7 |
| $Na_2O$ | 0.4-1.1 |
| $Li_2O$ | 0.6-0.1 |
| BaO | 0.0-0.9 |
| $Fe_2O_3$ | 0.1-0.5 |
| $TiO_2$ | 0.2-0.8 |

-continued

| | |
|---|---|
| K$_2$O | 0.1–0.5 |

7. A boron-free glass fiber having the following composition by weight:

| | |
|---|---|
| SiO$_2$ | 55.9–60.5 |
| Al$_2$O$_3$ | 12.8–17.1 |
| MgO | 5.3–5.4 |

-continued

| | |
|---|---|
| CaO | 14.9–17.7 |
| Na$_2$O | 0.4–1.1 |
| Li$_2$O | 0.6–1.0 |
| BaO | 0.0–0.9 |
| Fe$_2$O$_3$ | 0.1–0.5 |
| TiO$_2$ | 0.2–0.8 |
| F$_2$ | 0.1–1 |
| K$_2$O | 0.1–0.5 |

8. The glass fiber composition of claim 1 wherein titania (TiO$_2$) is present in a minor amount of less than 0.8 weight percent of the composition.

* * * * *